United States Patent Office 3,297,483
Patented Jan. 10, 1967

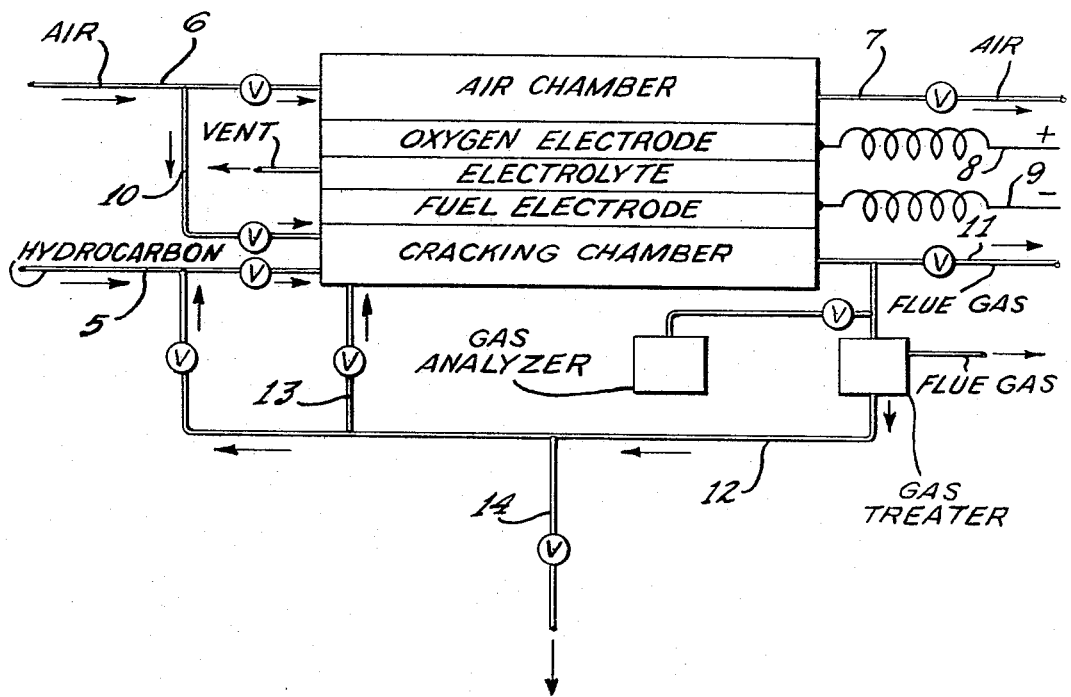

3,297,483
METHOD FOR GENERATING ELECTRICAL ENERGY FROM LIGHT GASEOUS FUEL
James E. McEvoy, Morton, Pa., assignor to Air Products and Chemicals, Inc., Philadelphia, Pa., and Northern Natural Gas Company, Omaha, Nebr., both corporations of Delaware
Filed Apr. 7, 1965, Ser. No. 446,272
7 Claims. (Cl. 136—86)

This application is a continuation-in-part of application Serial No. 19,068, filed March 31, 1960, now abandoned.

The invention relates to a method for generating electrical energy from light hydrocarbonaceous fuels, such as methane or mixtures of methane and lighter hydrocarbons, which normally are decomposable only at temperatures well in excess of 1000° F., and contemplates the use of a dual function fuel cell, adapted for high-temperature operation, wherein the hydrocarbon fuel is first catalytically cracked to produce electrochemically oxidizable gaseous material, and the latter is then oxidized as formed, both cracking and oxidation reactions being carried out in the same zone and in the presence of the catalytic fuel electrode of the fuel cell.

Light hydrocarbons have been proposed as fuel for fuel cells, utilizing air as the oxidant material. In the well-known Gorin fuel cell, as exemplified by U.S. Patent No. 2,581,650 to Gorin, methane has been proposed as a suitable fuel. The methane, however, is not introduced directly into the fuel chamber of the cell. It is contacted with high temperature steam in a separate gasification zone to produce hydrogen and carbon monoxide in the well-known water-gas reaction. The gaseous products of the water-gas reaction are then charged to the fuel chamber of the cell. With air as the oxidant material supplied to the oxygen chamber of the cell, the oxidizable components of the water-gas are electrochemically oxidized to produce electric current.

By reason of the high temperatures necessarily employed in the utilization of such fuels, it is required that the elements of the fuel cell, such as the electrodes, electrolyte, etc., be of such composition as not to be adversely affected by the prevailing high temperatures. Thus, it is impractical to use any of the common aqueous electrolytes. The most practical electrolyte material is one which is in a solid state at normal temperatures, but which becomes molten at high temperatures, such as those prevailing in the decomposition and oxidation reactions. Known electrolyte materials for high temperature operation are the various alkali carbonates, such as sodium carbonate, potassium carbonate, lithium carbonate, etc. or mixtures thereof, the particular carbonate or mixture of carbonates being selected in accordance with the temperature requirements.

It is known that light, normally gaseous acyclic hydrocarbons, such as methane or ethane, are difficult to decompose, because of their great thermal stability. However, at atmospheric pressure and in the presence of a suitable catalytic material, such as nickel, and at elevated temperatures well in excess of 1000° F., such as in the range of about 1400–1800° F., a relatively high degree of decomposition may be effected, in accordance with the equations $$CH_4 \xrightarrow{\text{Heat}} C + 2H_2 \quad (1)$$

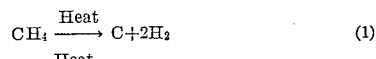

$$C_2H_6 \xrightarrow{\text{Heat}} 2C + 3H_2 \quad (2)$$

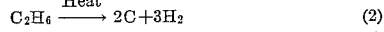

The equilibrium concentration of hydrogen in the gaseous products of such catalytic cracking may be in the order of about 75–95%, the remaining portion of the product gas being uncracked hydrocarbon. The degree of cracking will depend upon the severity of the cracking conditions. In a continuous cracking operation, the reaction may be carried out at temperatures in the lower portion of the stated temperature range and with continuous recycle, with resultant lowering of the conversion per pass, in order to avoid or alleviate the problems incident to operation at the higher temperature levels, one of which problems could be the need to employ expensive temperature-resistant alloys in the construction of the apparatus.

The non-gaseous product of the hydrocarbon cracking reaction is carbon, which is deposited throughout the cracking chamber, including the surface of the catalytic material, upon which latter it forms a contaminant coating which gradually deactivates the catalyst.

It is known also that, at temperatures above about 1200° F., such as in the range of about 1400–1800° F., carbon will react instantaneously with the free oxygen in a stream of free oxygen-containing gas, such as air or oxygen, and, where the free or molecular oxygen in the combustion-supporting gas is limited to the extent that there is insufficient oxygen to effect complete oxidation of the carbon, the gaseous product of such combustion will be preponderantly rich in carbon monoxide. At temperatures in the range of 1400–1800° F., for example, carbon monoxide will predominate to the extent of comprising about 83–98 wt. percent of the total carbon oxides in a carbon/carbon monoxide/carbon dioxide system.

Hydrogen is a highly efficient fuel for fuel cells, its desirability however being limited to some degree by the dangers incident to transportation and storage in quantity. To a lesser degree, carbon monoxide alone also is a suitable fuel for fuel cells.

The electrochemical reactions involved in the oxidation of both hydrogen and carbon monoxide in a high-temperature fuel cell employing alkali or alkaline earth carbonates, or mixtures thereof, as the electrolyte are as follows:

*Fuel-hydrogen*

Anode reaction $$H_2 + CO_3^= \rightarrow H_2O + CO_2 + 2e^- \quad (3)$$

Cathode reaction $$\tfrac{1}{2}O_2 + 2e^- \rightarrow O^= \quad (4)$$
$$O^= + CO_2 \rightarrow CO_3^= \quad (5)$$

Overall reaction $$H_2 + \tfrac{1}{2}O_2 \rightarrow H_2O \quad (6)$$

*Fuel-carbon monoxide*

Anode reaction $$CO + CO_3^= \rightarrow 2CO_2 + 2e^- \quad (7)$$
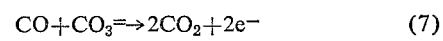

Cathode reaction $$\tfrac{1}{2}O_2 + 2e^- + CO_2 \rightarrow CO_3^= \quad (8)$$

Overall reaction $$CO + \tfrac{1}{2}O_2 \rightarrow CO_2 \quad (9)$$

In accordance with the invention, a light hydrocarbon gaseous material is introduced directly into the fuel chamber of a high-temperature fuel cell, without any previous decomposition treatment externally of the cell, and the components thereof are ultimately utilized within said fuel chamber for the production of electrical energy in a two-step cyclic process involving successive stages of hydrocarbon cracking and electrode regeneration.

Since in situ cracking of the light gaseous hydrocarbon is contemplated, the fuel cell is of the high temperature type, which by arbitrary classification may be considered as one operating at temperatures in excess of 500° C., that is, well over 1000° F.

In view of the high temperatures employed, such as between about 1400–1800° F., the physical components of the fuel cell must be such as to withstand the high temperature.

The feed cracking and the electrochemical oxidation reactions are both catalytic in nature. The fuel chamber is therefore provided with catalytic material or materials suitable to promote the various chemical and electrochemical reactions taking place within the chamber.

The fuel cell electrodes, that is, the anode and cathode which form barriers between the electrolyte chamber and the fuel and oxygen chambers, respectively, are porous supports containing the catalytic materials. The catalytic material for the oxygen side of the cell need be suitable to promote only the cathodic reaction. The catalyst for the fuel side of the cell may be a single material which will serve the dual function of promoting both the hydrocarbon cracking reaction and the anodic electrochemical oxidation reaction, or it may comprise different catalytic materials for the separate reactions. The catalytic material for the electrochemical anodic reaction is necessarily supported upon the porous anode, but the catalyst for the hydrocarbon cracking reaction may be either on the electrode or disposed elsewhere within the fuel chamber.

The electrolyte may comprise any one or any combination of alkali or alkaline earth carbonates which are stable at the elevated temperatures employed. Typical are the carbonates of sodium, potassium and lithium. The normally solid carbonate or mixture of carbonates comprising the electrolyte is in molten state during the high temperature operation of the cell and returns to the solid state upon cooling, after the cell operation is discontinued.

When the light hydrocarbon feed enters the fuel or cracking chamber, the latter is free of any molecular oxygen, so that, at the high temperature in excess of 1000° F. and in the presence of the cracking catalyst, the light gaseous hydrocarbon will be chemically decomposed to hydrogen and carbon in accordance with the equation (for methane fuel)

$$CH_4 \xrightarrow{\text{Heat}} C + 2H_2 \quad (10)$$

The hydrogen immediately becomes available in situ as fuel for electrochemical oxidation at the catalytic anode, with release of electrons. Gas flow through the cracking chamber during the cracking period is continuous, and preferably the temperature is such that there is somewhat less than maximum conversion. This avoids problems attendant extreme high temperature operation. The effluent therefore contains uncracked methane and unused hydrogen, both of which are continuously recycled to the cracking zone. The effluent also contains water according to Reaction 3 which is derived not from the cracking reaction but from the electrochemical oxidation of the hydrogen. The water, which is in the form of steam at the prevailing temperature, is removed from the recycle stream in known manner. Steam is also removed from the electrolyte chamber by the usual provisions for venting.

Simultaneously with the introduction of hydrocarbons to the cracking chamber, air or oxygen is supplied to the oxygen chamber, so that the aforementioned oxidation and reduction Reactions 3 to 6 may be effected. The methane cracking reaction continues, with continuous supply of fresh hydrocarbon feed and recycle of methane and hydrogen, and with continuous oxidation of the hydrogen for the generation of electric current. At the same time, carbon, the other product of the cracking reaction, is gradually deposited on the exposed surface of the porous catalytic anode and other exposed surfaces within the cracking chamber, which may include the surface of other catalyst. The deposited carbon acts as a contaminant upon the catalyst.

The carbonaceous deposit builds up gradually on the catalytic surface areas and eventually seals off enough of the catalyst sites to deactivate the same, to the extent that the efficiency of the fuel cell is finally reduced to a minimum acceptable level.

The degree to which the efficiency of the fuel cell is impaired may be measured by the fall-off in current output or by analysis of the cracking zone effluent, or in any other suitable manner, the measurement or analysis being carried out with conventional apparatus. Before the efficiency of the fuel cell falls below the acceptable minimum level, the flow of hydrocarbons into the fuel chamber is discontinued, and air or oxygen is introduced in controlled amount into the fuel or cracking chamber to remove deposited carbon by rapid combustion. This regeneration opeartion is somewhat similar to that practiced in the regeneration of coked catalyst in known petroleum refining processes.

At the high temperatures prevailing in the cracking zone, such as about 1400–1800° F. or even higher, the combustion of the deposited carbon is substantially instantaneous, resulting in a preponderant partial oxidation of the carbon to carbon monoxide, so that the fuel chamber effluent during the regeneration period may be said to be rich in carbon monoxide. Such preferential partial oxidation of carbon to carbon monoxide under conditions of high temperature, such as well in excess of 1000° F. (for example, 1400–1800° F.) and of limited free molecular oxygen supply (insufficient to effect complete oxidation) is a phenomenon well known in the art.

The flue gas effluent from the regeneration operation will be predominantly a mixture of nitrogen and carbon monoxide, with relatively small amounts of carbon dioxide, steam and other gaseous material. The carbon monoxide, being itself a suitable fuel for electrochemical oxidation, is oxidized, as formed, the excess unreacted carbon monoxide being recovered from the flue gas in an external flue gas treating operation which removes all undesirable gaseous components, such as carbon dioxide, water vapor, etc., from the effluent. The recovered, relatively pure, carbon monoxide is continuously recycled to the fuel chamber during the regeneration period. The utiliaztion of the carbon monoxide for generation of electric current is in accordance with equations 7 to 9.

To repeat, the overall process is continuous, with periodic interruption of the cracking phase in order to regenerate the catalytic material and free the porous anode of the pre-blocking deposit of carbon. The changeover from the cracking phase to the regeneration phase may be effected manually or automatically in response to standard measurement and control devices which may operate the various valves in desired sequence.

It is a feature of the process that the generation of electrical current is continuous, that the fuel supply for the anodic reactions merely alternates between hydrogen, while cracking, and carbon monoxide, while regenerating, and that all fuel for electrochemical oxidation is formed by chemical reaction directly within the fuel chamber in the presence of the anode, and while oxygen is being continuously supplied to the cathode, so that the fuels become directly available as formed.

Furthermore, the high temperatures prevailing at all times during the operation of the fuel cell preclude the presence of water, as such, anywhere within the cell. Any water which may be forming by the chemical or electrochemical reactions involved in the process is immediately carried out of the cell in the effluent streams or in the vent arrangements provided. Any components of the effluent streams which would be undesirable in the fuel chamber are removed from the effluent before recycling the recovered fuel component to the fuel chamber.

In one embodiment of the invention, multiple cells of the type herein described may be arranged as a battery comprising, for example, hundreds, or possibly thousands, of individual cells. In such arrangement, it is contemplated that the recycle material recovered from the effluent streams of a cell may be conveyed to another cell in the same phase of operation, instead of being recycled to the cell of its origin.

Regardless of the number of cells employed or of the provisions made for recycle in an individual cell or for serial flow of reactants between cells, the presence of free molecular oxygen, water vapor and carbon dioxide within the fuel chamber is detrimental to the operation of the fuel cell. While free oxygen has to be introduced into the fuel chamber to remove the deposited carbon by combustion, the supply is so limited and the combustion is so instantaneous that it is all consumed in the combustion reaction. The presence of excess or residual free oxygen at the active sites of the anode while oxygen is being supplied to the cathode would seriously affect the operation of the cell.

With respect to the recycling of carbon monoxide recovered from the flue gas effluent during the regeneration period, the carbon monoxide may be reintroduced directly into the chamber wherein it was originally formed or into another fuel chamber, of a battery of cells, undergoing regeneration. Alternatively, the recycle carbon monoxide may be introduced into a fuel chamber undergoing hydrocarbon cracking, in which case the carbon monoxide will be electrochemically oxidized along with the hydrogen. For most practicable operation, however, the former type of recycle is to be preferred.

For a fuller understanding of the invention reference may be had to the accompanying drawing forming a part of this application and diagrammatically illustrating a single fuel cell adapted to carrying out the method of the invention. As shown, the cell may be operated as a single unit, with continuous recycled electrochemically oxidizable material formed directly within the fuel chamber, but not immediately consumed, and recovered from the fuel chamber effluent. Or, the cell may be considered as one unit of a battery of similar cells, provision being shown in the drawing for conveyance of the recycle material to another cell of the battery.

Since the drawing is purely diagrammatic, the invention is not to be considered as being limited to the particular details shown by way of illustration.

The cell for carrying out the method of the invention comprises a closed housing containing a pair of parallel porous catalytic electrodes spaced from each other and from opposite sides of the housing and dividing the housing into three separate chambers. The confined space between the electrodes forms the electrolyte chamber, while the spaces between the housing walls and the anode and cathode form the cracking or fuel chamber and the air or oxygen chamber, respectively. The electrodes may be in the form of relatively thin plates of porous carbon impregnated with or acting as supports for catalytic material adapted to promote the anodic and cathodic reactions. The catalytic material on the anode may be such as to promote also the high temperature catalytic cracking of light hydrocarbons, or additional catalytic material for this purpose may be provided on the electrode or elsewhere within the cracking chamber.

The cracking chamber is supplied through line 5 with preheated light gaseous hydrocarbon feed, which for the purpose of describing the operation of the method will be considered to be methane, although a lighter hydrocarbon or hydrocarbon mixture may be employed. The hydrocabon feed may be considered as fuel only in a general sense, since it is not electrochemically oxidized directly but must subsequently be decomposed to provide hydrogen as the actual fuel cell fuel.

While the methane is being supplied to the cracking or fuel chamber, preheated free oxygen-containing gas, such as air, is introduced through line 6 in to the air or oxygen chamber. The flow of hot air through the air chamber is continuous, the unused portion of the air being discharged through valved air outlet line 7.

Within the cracking or fuel chamber two types of reaction occur during both the cracking period and the regenerating period, the first in each case being a chemical reaction resulting in the formation of an electrochemically oxidizable material, and the second being the electrochemical reaction whereby the formed material is oxidized for the production of electric current. The two types of reaction occur simultaneously, the electrochemically oxidizable material being oxidized as formed.

Suitable provision is made for maintaining the fuel cell at the desired high temperature well in excess of 1000° F., so that the various reactions may readily be carried out in the presence of the catalytic material.

During the cracking period, methane is decomposed to form hydrogen and carbon. The cracking chamber is free of any deleterious gaseous material which could adversely affect the operation of the cell, such as molecular oxygen, water vapor and carbon dioxide. The hydrogen immediately becomes available to the active catalytic sites throughout the porous catalytic anode and is electrochemically oxidized by the carbonate ions migrating from the cathode through the electrolyte to the active sites on the anode. The carbon is deposited upon all wall and other surfaces within the cracking chamber as well as within the pores of the anode. The carbon is a contaminant and its deposition is progressive with continuance of the cracking reaction.

The electrical energy generated by the electrochemical oxidation of the hydrogen is withdrawn from the cell as electric current through terminal 9 which is in good electrical contact with the anode, the circuit of current flow being completed through terminal 8 which is in good electrical contact with the cathode.

After a period of continuous operation in the cracking stage, the carbonaceous deposit accumulating on the active surfaces of the anode tends to gradually close the pores of the porous body and seal off the active catalytic surfaces, thereby diminishing the efficiency of the cell. The diminution of cell efficiency is readily determined by withdrawal of a gas sample from the outlet line 11 of the cracking chamber for analysis in a gas analyzer provided for such purpose, or by other known methods for making such determination.

When the decrease in cell efficiency is such as to indicate that the catalytic anode has lost its activity to a degree where its further use for the generation of electrical energy becomes impractical the anode requires regeneration by removal of the carbon deposit.

Regeneration of the anode is readily accomplished by discontinuing the flow of methane charge and recycle methane and hydrogen into the cracking chamber and immediately introducing therein a flow of air, which conveniently may be obtained by by-passing through branch line 10 a portion of the heated air being supplied to the oxygen side of the cell through line 6.

The amount of air introduced into the cracking chamber should be consistent with temperature requirements and avoidance of overheating. More importantly, the air must not be in excess of the amount required for the combustion of carbon to form the desired carbon monoxide rich effluent. It is contemplated that the amount of air introduced for regeneration purposes will be so controlled, in known manner, that there will be substantially no free molecular oxygen at the anode to adversely affect the operation of the cell.

The carbon monoxide formed by the combustion of carbon being an electrochemically oxidizable material, immediately becomes available as fuel for oxidation at the anode, so that generation of electrical energy is not interrupted.

The gaseous combustion products of regeneration, or flue gas, is continuously discharged from the cracking chamber thorugh line 11. The flue gas contains the unused components of the air supply, as well as some carbon dioxide, some unused carbon monoxide and possibly water vapor. Although the effluent could be discharged from the system as waste gas, it is considered more practical to reclaim and recycle the carbon monoxide fuel during the regeneration period. For such purpose, the flue gas is returned to the cell through line 12 which includes a gas treater.

The gas treater, only diagrammatically shown in the drawing, may be of any known design capable of removing from the gas stream all of the undesirable components, so that only the carbon monoxide is recycled to the cell. All other components of the flue gas stream are discharged from the treater as waste. The same treater may be employed to remove undesirable gaseous material, such as water vapor, from the gaseous effluent of the cracking operation. In the latter phase, the effluent stream will consist almost entirely of uncracked methane and unoxidized hydrogen. If any water vapor formed at the anode by the electrochemical oxidation of the hydrogen is not otherwise removed, as by the provision for venting the electrolyte chamber, and accompanies the effluent gas out of the cracking chamber, such water can be removed by the treater.

Thus, recycle line 12 will alternatively receive from the treater a recycle charge of methane and hydrogen for the cracking phase or a recycle charge of carbon monoxide for the regeneration phase. During the cracking phase, the recycle material may be introduced into the hydrocarbon feed line 5, and during the regeneration phase the recycle material may be introduced by valved branch line 13 directly into the fuel chamber, as shown, or into the by-pass hot air line 10.

All or a portion of the recycle material may be withdrawn from line 12 and passed to other fuel cells operating in the same phase through valved line 14. This is an optional arrangement where a multiplicity of the cells are arranged as a battery.

Although not shown in the drawing, and not considered necessary to a full understanding of the invention, it is to be understood that, wherever necessary, suitable inlets and outlets are provided for the purpose of servicing the several chambers of the cell, such as introducing or removing electrolyte material or for draining condensate, if any, after shutdown and cooling of the cell.

As stated, both electrodes of the cell are porous bodies comprising catalytic material capable of promoting the various reactions involved.

The oxygen electrode may be of any composition known to be suitable for the purpose intended, such as porous lithiated nickel or iron fabricated as a sintered metal structure or body, or supported in or upon a porous structure comprising a suitable heat-resistant, electroconductive material.

The fuel electrode may comprise active nickel or iron either in the form of a sintered porous metal structure or body, or supported in or upon a porous structure comprising a suitable heat-resistant, electroconductive material.

The catalytic material of the fuel electrode may be such as to serve the dual function of catalyzing both the cracking reaction and the electrochemical oxidation reactions.

In the construction of a fuel cell for carrying out the method of the invention provision must be made, with respect to materials of construction and insulation, for handling the relatively high temperatures involved in the various reactions.

In normal use, it is contemplated that the cell will be as self-sufficient with respect to heat requirements as may be practicable. Heat required for the cracking operation may be obtained in part from the combustion of the deposited carbon during the regeneration period and in part from the electrochemical oxidation of the hydrogen and carobn monoxide. The usual provisions for waste heat utilization are contemplated. Thus, the incoming reactants may be heated by indirect heat exchange with the portions of gaseous effluent being exhausted from the system.

Desirably, the cell structure will be as light and compact as possible, the porous plate electrodes will be of minimum thickness and the spacing between the electrodes and the opposite wall surfaces will be kept to a minimum. In this way, electrochemically oxidizable fuel resulting from the cracking and the regeneration reactions will be formed as close to the active sites on the catalytic anode as may be practicable, so that utilization of the fuel is almost immediate.

While the effluent gas treating system associated with the fuel cell has been described as functioning for the purpose of recoving potential fuel material during both the cracking phase and the regeneration pase of operation, or for removing undesirable components before recycling the effluent to the same cell or other cells, it is to be understood that, if needed, other gaseous components may be recovered for reuse in the cell. For example, it is expected that much of the carbon dioxide which is formed at the anode will enter and disperse throughout the electrolyte, so that it will be available for the cathodic reaction. If there is any deficiency in the amount of carbon dioxide which is derived from the electrolyte, additional carbon dioxide may be recovered from the effluent streams passing through the treater and be recycled to the fuel cell by introduction into the oxygen chamber.

Obviously many modifications and variations of the invention as hereinbefore set forth may be made without departing from the spirit and scope thereof, and therefore only such limitations should be imposed as are indicated in the appended claims.

What is claimed is:

1. The method for generating electrical energy from a preheated stream consisting essentially of light gaseous fuel containing light, normally gaseous acyclic hydrocarbons normally decomposable only at temperatures well in excess of 1000° F., which comprises the steps of:

(a) introducing said fuel stream into the fuel chamber of a fuel cell adapted for high-temperature operation in the range of about 1400–1800° F. and having porous catalytic electrodes separated by a body of molten carbonate electrolyte which is stable at the aforesaid high temperature and contains carbonate ions;

(b) thermochemically cracking the light hydrocarbons within the fuel chamber at a temperature within the range of between 1400°–1800° F., in the absence of any free oxygen, to form hydrogen which is then electrochemically oxidized at the anode, with release of electrons, and carbon which is deposited as a contaminant which gradually seals off the catalytically active sites, with resultant loss of cell efficiency;

(c) simultaneously introducing free oxygen-containing gas into the oxygen chamber of said cell and transferring electrons released at said anode through an external electroconductive path to the cathode, said electrons combining with the free oxygen and with available carbon dioxide derived from the anodic reactions to maintain a continuous flow of carbonate ions through the body of electrolyte to the anode;

(d) continuously withdrawing the gaseous effluent of the concomitant cracking and electrochemical reactions and treating the same to recover as fuel any unused hydrocarbons and hydrogen;

(e) discontinuing the flow of gaseous fuel when the decrease in cell efficiency resulting from the carbon deposition renders continued operation impractical;

(f) simultaneously introducing preheated free oxygen-containing gas into the fuel chamber to effect substantially instantaneous combustion of deposited carbon, with resultant formation of a gaseous combustion product rich in carbon monoxide, which latter is then electrochemically oxidized at the anode, with release of electrons;

(g) continuously withdrawing the gaseous effluent of the combustion and electrochemical reactions and treating the same to recover as fuel any unused carbon monoxide;

(h) discontinuing the flow of free oxygen-containing gas into the fuel chamber when sufficient carbon has been removed to reactivate the catalytic material;

(i) and repeating the cycle of operation to maintain the uninterrupted generation of electrical energy.

2. The method of claim 1, in which said recovered hydrocarbons and hydrogen and said recovered carbon monoxide are recycled directly to said fuel chamber.

3. The method of claim 1, in which said fuel cell is one of a battery of such cells and said recovered hydrocarbons and hydrogen and said recovered carbon monoxide are respectively conveyed directly to another cell of said battery operating in the same phase.

4. The method of claim 1, in which the catalyst of said porous catalytic anode is effective to promote both the thermochemical and the electrochemical reactions occurring within said fuel chamber.

5. The method as in claim 4, in which the active component of said porous catalytic anode for promoting said thermochemical and electrochemical reactions is a transition metal.

6. The method of claim 1, in which there is present within said fuel chamber separate catalytic material for effecting said cracking reaction.

7. The method for generating electrical energy from a preheated stream consisting essentially of methane-containing gas, which comprises the steps of:

(a) introducing said methane-containing gas into the fuel chamber of a fuel cell adapted for high-temperature operation in the range of about 1400–1800° F. and having porous catalytic electrodes separated by a body of molten carbonate electrolyte which is stable at the aforesaid high temperature and contains carbonate ions;

(b) thermochemically cracking the methane-containing gas within the fuel chamber at a temperature within the range of between 1400–1800° F., in the absence of any free oxygen, to form hydrogen which is then electrochemically oxidized at the anode, with release of electrons, and carbon which is deposited as a contaminant which gradually seals off the catalytically active sites, with resultant loss of cell efficiency;

(c) simultaneously introducing free oxygen-containing gas into the oxygen chamber of said cell and transferring electrons released at said anode through an external electro-conductive path to the cathode, said electrons combining with the free oxygen and with available carbon dioxide derived from the anodic reactions to maintain a continuous flow of carbonate ions through the body of electrolyte to the anode;

(d) continuously withdrawing the gaseous effluent from the concomitant cracking and electrochemical reactions and treating the same to recover as fuel any unused methane-containing gas and hydrogen;

(e) discontinuing the flow of methane-containing gas when the decrease in cell efficiency resulting from the carbon deposition renders continued operation impractical;

(f) simultaneously introducing preheated free oxygen-containing gas into the fuel chamber to effect substantially instantaneous combustion of deposited carbon, with resultant formation of a gaseous combustion product rich in carbon monoxide, which latter is then electrochemically oxidized at the anode, with the release of electrons;

(g) continuously withdrawing the gaseous effluent of the combustion and electrochemical reactions and treating the same to recover as fuel any unused carbon monoxide;

(h) discontinuing the flow of free oxygen-containing gas into the fuel chamber when sufficient carbon has been removed to reactivate the catalytic material; and (i) repeating the cycle of operation to maintain the uninterrupted generation of electrical energy.

References Cited by the Examiner

UNITED STATES PATENTS

| 2,384,463 | 9/1945 | Gunn et al. | 136—86 |
| 2,581,651 | 1/1952 | Gorin | 136—84 |
| 3,068,311 | 12/1962 | Chambers et al. | 136—86 |

OTHER REFERENCES

Young, G. J., Fuel Cells London, Reinhold, 1960, chap. 7, pp. 101–103, by Chambers et al., Carbonaceous Fuel Cells.

WINSTON A. DOUGLAS, *Primary Examiner.*

ALLEN B. CURTIS, *Examiner.*